United States Patent [19]

Edwards et al.

[11] 4,170,681

[45] Oct. 9, 1979

[54] METHOD OF APPLYING A VARNISH LAYER TO A PRINTED SURFACE AND PRODUCT MADE THEREBY

[75] Inventors: John R. Edwards, Chester; George K. Rennie, Wirral; David A. Rosser, Wirral; Colin Smart, Wirral, all of England

[73] Assignee: Lever Brothers Company, New York, N.Y.

[21] Appl. No.: 871,037

[22] Filed: Jan. 20, 1978

[30] Foreign Application Priority Data

Jan. 21, 1977 [GB] United Kingdom ................. 2549/77

[51] Int. Cl.[2] ................................................ B32B 3/10

[52] U.S. Cl. ................................ 428/205; 101/416 B; 260/8; 427/258

[58] Field of Search ................ 427/258; 428/205, 204; 101/416 R, 416 B; 260/8

[56] References Cited

U.S. PATENT DOCUMENTS

| | | | |
|---|---|---|---|
| 2,696,168 | 12/1954 | Costello | 427/258 X |
| 3,506,467 | 4/1970 | Ulrich | 101/416 R X |
| 4,042,748 | 8/1977 | Hebbel et al. | 260/8 X |

*Primary Examiner*—Evan K. Lawrence

[57] ABSTRACT

A method of applying a protective varnish layer on a hydrophilic surface carrying at least one area of hydrophobic ink, and the resultant product. The method comprises: applying to at least the inked portions of the surface a layer of an aqueous dispersion containing 5% to about 60% by weight of a film forming polymer or copolymer and 0.5% to about 10% of an auxiliary film forming material capable of raising the critical surface tension of the hydrophobic inked area; and allowing the applied layer to dry.

14 Claims, No Drawings

METHOD OF APPLYING A VARNISH LAYER TO A PRINTED SURFACE AND PRODUCT MADE THEREBY

BACKGROUND OF THE INVENTION

This invention relates to the coating of printing surfaces with a varnish layer to provide a smooth protective surface. Examples of printing surfaces are paper, metal foil and the surface may be a part of a material, e.g. paper sheet, paperboard, corrugated board or laminated structure.

When the printed surface of a body is printed with a pattern of printing ink or inks, some of which may have hydrophobic surfaces, it is desirable to form a protective layer over the inked surface or the whole treated surface. This varnish layer will protect either the inked surface or the whole surface from physical damage during subsequent handling.

An example of a printing surface is an untreated paper surface which is hydrophilic and liquid compositions based on water will spread readily over the surface. While some printing inks accept water based compositions, other inks form a hydrophobic surface which rejects water based compositions. Thus, when using a water based composition, areas covered by hydrophobic printed inks will reject the composition and a discontinuous varnish layer will be formed. When varnishing paper surfaces in manufacturing facilities the use of water based compositions is preferred because solvent based compositions require fire precautions to be taken. Varnishes coated using lithographic processes are usually based on drying oils. This invention is of particular application to paper surfaces. A paper surface is formed by a mass of discrete cellulosic fibres bonded together by deposition from a fluid medium, for example air or water. Mineral or synthetic fibres may also be present.

SUMMARY OF THE INVENTION

The invention proposes a method capable of providing a continuous coating over a surface carrying areas inked with a printing ink and the product made thereby. While thick films obtain stability from from their bulk, thinner films may break-up due to contact with hydrophobic areas.

The method of the invention comprises forming a varnish layer on a hydrophilic surface carrying areas of hydrophobic inks. The method comprises: applying to at least the inked portions of the surface a layer of an aqueous dispersion having a viscosity from about 25 to about 500 cps and containing from about 5% to about 60% by weight of a film forming copolymer or polymer substantially insoluble in water at neutral pH, formed from a vinyl ester and/or acrylic ester optionally polymerised with a monomer moiety in the molar ratio of about 1:10 to about 10:1, wherein the dispersion further contains from about 0.5% to about 10% of an auxiliary film forming material capable of raising the critical surface tension of the hydrophobic inked area when coated thereon; and allowing the applied layer to dry.

DESCRIPTION OF THE PREFERRED EMBODIMENTS

Preferably the dispersion has a viscosity from about 50 to about 300 cps. The method of the invention is particularly applicable to the coating of hydrophobic ink areas having a critical surface tension (CST) less than about 30 dynes $cm^{-1}$ and of particular benefit when the CST is less than about 25 dynes $cm^{-1}$.

Preferably the auxiliary material raises the CST by at least about 5 dynes $cm^{-1}$ and more preferably by at least about 10 dynes $cm^{-1}$.

Film Forming (Co) Polymer

The polymer or copolymer providing the varnish layer is deposited from an aqueous dispersion and a number of these (co) polymers are commercially available.

Preferred film forming materials are selected from the group consisting of (i) polymers of vinyl esters, (ii) polymers of acrylic esters, (iii) copolymers of vinyl and acrylic esters, (iv) copolymers of vinyl and/or acrylic esters with a monomer moiety selected from the group consisting of styrene, crotonic acid, itaconic acid, acrylic acid, 2-ethyl hexyl acrylate, and alkenes with 2 to 12 carbon atoms, and (v) polymers of alkyl methacrylic esters, wherein the alkyl group contains from 1 to 12 carbons atoms.

The preferred ester, and that in general use in industry, is the acetate.

Examples of the copolymer or polymer forming the varnish layer will be found in reference books, eg Kirk-Orthmers Encyclopedia of Chemical Technology (2nd Edition Interscience 1963) and patent specifications eg UK Pat. No. 1157040.

Preferably the monomer moiety contains a carboxylic acid group.

The Auxiliary Film Forming Material

This material is required to raise the critical surface tension by at least about 5 dynes $cm^{-1}$, and preferably by at least about 10 dynes $cm^{-1}$. By increasing the critical surface tension the water based dispersion spreads more readily over the hydrophobic ink surface.

Preferred materials are selected from the group consisting of (i) caesin, (ii) polyvinyl pyrollidone and copolymers thereof with vinyl acetate, and (iii) alkali soluble copolymers of maleic anhydridie with a moiety selected from the group consisting of styrene, alkenes having from 2 to 16 carbon atoms, vinyl alkyl ethers having from 1 to 4 carbon atoms in the alkyl group, and rosin acids with subsequent reaction with polyhydric alcohols containing 2 to 6 carbon atoms to provide a material with an acid value from about 100 to 250.

The critical surface tensions of auxiliary materials were measured using the method of Zisman. A full description of the method will be found in Industrial and Engineering Chemistry vol 55 No 10 (1963) pages 19 to 58.

The measurements were performed using a hydrophobic ink (Yellow 65486 of Johnston and Cumbers Ltd of Birmingham, England) found to be difficult to coat with aqueous coating formulations. The ink was printed onto paper board using a litho process and allowed to dry. An aqueous solution or aqueous/isopropanol solution (15% weight/volume) of the auxiliary material was prepared at pH 8 (adjusted by ammonia solution) and this was coated onto the ink surface to give a coherent film on drying with a film weight of about 8 $g/m^2$.

Drops of liquid of different known surface tensions were placed on the dried film of auxiliary material and the contact angle (CA) measured using a travelling microscope. The surface tensions of the liquids were then plotted against cos CA and the resultant straight line extrapolated to cos CA = 1. The intercept gives the critical surface tension (CST) for the surface.

A number of auxiliary materials have been studied using this method and critical surface tensions (in dynes $cm^{-1}$) are given in Table I.

Table I

| Auxiliary Material | CST |
|---|---|
| None | 25 |
| A | 33 |
| B | 34 |
| C | 35 |
| D | 32 |
| E | 45 |
| F | 37 |
| G | 31 |
| H | 55 |

A was SR 88 resin (an adduct of polyhydric alcohol with the condensation product of rosin acids and maleic anhydride) obtained from Schenectady-Midland, a British company, of Wolverhampton.

B was Lytron 812 (a copolymer of maleic anhydride and styrene) obtained from Monsanto Co., a U.S. company, of St. Louis, Missouri.

C was Resin PA6 (a copolymer of maleic anhydride and 1-hexene) obtained from Gulf Oil Corp., a USA company, of Houston, Texas.

D was Casein.

E was S 630 (a copolymer of vinyl pyrollidone and vinyl acetate) obtained from GAF (Great Britain) Ltd of Manchester, England.

F was K30 (polyvinyl pyrollidone) obtained from GAF (Great Britain) Ltd.

G was EMA21 (a copolymer of maleic anhydride and ethylene) obtained from Monsanto Co.

H was Gantrez AN169 (a copolymer of maleic anhydride and methyl vinyl ether) obtained from GAF (Great Britain) Ltd.

The use of auxiliary materials to increase the critical surface tension of the ink surface is more effective than the addition of surfactant to the coating dispersion. The use of surfactant reduces the surface tension of the dispersion.

It is believed the second material is absorbed on and modifies the hydrophobic surface rendering it more compatible with the copolymer dispersion.

OPTIONAL ADDITIONAL MATERIALS

Optionally, the composition will contain up to 30% by weight of a polar organic liquid to assist in providing suitable foaming and viscosity values for the total composition.

An example of a liquid for this purpose is isopropanol. Coalescors, which assist in the film formation during drying, may be included. Coalescors are believed to act by assisting the dispersed particles to form a layer and examples are alkoxy alcohols, e.g. methoxy ethanol and, preferably, ethyl digol. The composition may contain other additives known in the technology for use with varnishes, for example plasticisers, antibacterial agents, agents to improve the abrasion resistance of the film for example dispersions of polyethylene of paraffin wax, thickeners and anti foams. Other material reducing the wetting tension of the total composition may effectively reduce also the contact angle of the surface dispersion when in contact with the hydrophobic ink surface.

The weight of the dried varnish layer will normally be from about 1 to about 25 $g/m^2$, preferably about 2 to about 10 $g/m^2$, per application. The coating method may be performed on a variety of types of machine but it has been found machines using roller coating techniques provide efficient coating with the defined composition. In general, printing machines providing a varnish layer by roller coating are satisfactory. There is no criticality in the method of forming the inked areas and letterpress, gravure and lithography may be used.

The method and composition of the invention provide a clear smooth protective layer with rapid drying of the coating on wet or dry ink to give a non tacky surface. The composition has satisfactory foaming during transfer, viscosity and film-forming characteristics and the final varnish layer has a satisfactory gloss. The gloss of a varnish layer is improved on hydrophobic inks by the presence of the auxiliary material, this property demonstrates the improved coating achieved. For some applications it may be desirable to use multiple coats. The composition and method allow a protective coating to be applied to a still wet inked surface immediately after printing and before stacking. The ink is then able to dry while stacked.

Examples of the composition and method according to the invention will now be described to illustrate but not limit the method and composition.

EXAMPLE 1

Unvarnished paperboard having a weight of about 300 gram per square meter was printed lithographically with conventional printing inks which gave both hydrophilic and hydrophobic surfaces; the latter with a critical surface tension below 25 dynes $cm^{-1}$. A composition containing 14% by weight Vinamul 6000 (a vinyl acetate/crotonic acid copolymer obtainable from Vinyl Products Limited, a British company of Carshalton, Surrey), 2.6% of SR88 resin (a condensation product of rosin acids and maleic anhydride, with subsequent reaction with polyhdric alcohols and obtainable from Schenectady-Midland, a British company, of Wolverhampton), 8.5% by weight of isopropanol, 4.5% by weight of ethyl digol, remainder water, was prepared.

The Vinamul 6000 and SR88 resin were obtained respectively as 55% by weight dispersion in water and a solid. These materials were separately dispersed in water using ammonium hydroxide to give a pH of 8.5 in each dispersion. The above composition quotes the solid polymer content of the total composition. The viscosity of the composition was about 200 cps.

The inked paperboard was coated with the composition using a Gula coating machine which is a spirit varnishing machine, wherein the composition is roller-coated onto the wet inked surface. The paperboard was coated to a weight of about 5 $g/m^2$ (dry weight) and the coating layer dried to a clear varnish coating in about 3 minutes without forced drying. After drying the lacquered surface had the properties described earlier.

EXAMPLE 2

Example 1 was repeated using a coating composition containing, by weight:

24.5% Vinacryl 4020 (an alkali soluble acrylic copolymer obtainable from Vinyl Products)

1.8% SR88 resin
19.2% isopropanol
4.0% ethyl digol
0.8% tributoxy ethyl phosphate as plasticiser
remainder water The varnished surface had the properties described earlier. Vinacryl 4020 was obtained as a 40% dispersion in water and ammonium hydroxide was added to bring the pH to 8.5.

The viscosity of the composition was about 200 cps.

EXAMPLE 3

Example 1 was repeated using a coating composition containing, by weight:

34.6% Vinacryl 7170 (an acrylic/styrene copolymer obtainable from Vinyl Products)
1.2% SR88 resin
1.5% casein
11.5% isopropanol
remainder water The viscosity of the composition was about 200 cps. The varnished surface had the properties described earlier. Vinacryl 7170 was obtained as a 50% dispersion in water. Caesin was obtained as a solid and formed into a 20% dispersion in water with the pH being adjusted to 8.5 with ammonium hydroxide.

EXAMPLE 4

Example 1 was repeated using a coating composition containing, by weight:

25.6% Vinacryl 4020
1.6% Licomer PE02 (a polyethylene dispersion obtained from Hoechst AG of Augsburg Germany)
1.2% SR88 Resin
8% is opropanol
16% n-propanol
remainder water (pH adjusted to 8.5 with ammonia)

The viscosity of the composition was about 200 cps and the varnished surface showed acceptable coating over the whole area.

EXAMPLE 5

Example 1 was repeated using a coating composition containing by weight 32.1% Vinamul 6705 (a vinyl acetate/ethylene graft copolymer obtained from Vinyl Products Ltd)
2.9% Licomer PE 02
2.1% Resin PA6
7.1% methylated spirit
remainder water (pH adjusted to 8.5 with ammonia)

The viscosity of the composition was about 200 cps and the varnished surface showed acceptable coating over the whole area.

EXAMPLE 6

Example 1 was repeated using a coating composition containing by weight:

37.2% Vinamul 6815 (a vinyl acetate/2-ethylhexyl acrylate copolymer obtained from Vinyl Products Ltd.)
3.3% Licomer PE 02
2.5% Lytron 812
0.8% tributoxy ethyl phosphate
remainder water (pH adjusted to 8.5 with ammonia)

The viscosity of the composition was about 200 cps and the varnished surface showed acceptable coating over the whole area.

EXAMPLE 7

Example 1 was repeated using a coating composition containing by weight:

27.8% Vinacryl 4020
17.4% PE 02
4.3% E335 (a copolymer of vinyl pyrollidone and vinyl acetate obtained as a 50% solution in isopropanol from GAP (Great Britain) Ltd.
17.4% n-propanol
remainder water (pH adjusted to 8.5 with ammonia)

The viscosity of the composition was about 200 cps and the varnished surface showed acceptable coating over the whole area.

EXAMPLE 8

Example 1 was repeated using a coating composition containing by weight:

31.1% Vinacryl 4290 (polybutyl methacrylate obtained from Vinyl Products Ltd.)
3.1% Licomer PE 02
7.7% iso propanol
6.9% dibutyl phthalate
1.1% (K30 (polyvinyl pyrollidone)
remainder water (pH adjusted to 8.5 with ammonia)

The viscosity of the composition was about 200 cps and the varnished surface showed acceptable coating over the whole area.

EXAMPLE 9

The effective coating of a hydrophobic ink area on a paper surface with compositions of the invention was demonstrated by studying the gloss of varnished surfaces. A varnish coating having low coating efficiency on the inked area will have a lower gloss than a coating with a good coating efficiency.

A paper surface was printed with areas of Yellow 65486 ink. A dispersion of film forming polymer and auxiliary material was then applied by hand roller. The gloss of the inked areas was measured before and after coating using a Sheen 45° gloss bead in conjunction with an EEL unigalvo. Δ gloss figures quoted are the differences in the readings before and after coating.

The varnish dispersion was prepared as a 15% weight/volume dispersion of a mixture prepared in parts by weight. The film forming polymers and auxiliary materials are those quoted previously in the Examples. The dispersion was adjusted to pH8 with ammonia.

| Mixture made into dispersion | | | | Auxiliary Material | Δ gloss |
|---|---|---|---|---|---|
| A. | (i) | Vinacryl 7170 | 9 parts | none | 24 |
| | | Ethyl digol | 0.5 parts | | |
| | | Auxiliary Material | 1 part | | |

-continued

| | | Mixture made into dispersion | | Auxiliary Material | Δ gloss |
|---|---|---|---|---|---|
| | (ii) | " | | A | 30 |
| | (iii) | " | | B | 33 |
| | (iv) | " | | C | 31 |
| | (v) | " | | D | 26 |
| B. | (i) | Vinamul 6705 | 9 parts | none | 19 |
| | | Auxiliary Material | 2 parts | | |
| | (ii) | " | | C | 26 |
| | (iii) | " | | E | 22 |
| C. | (i) | Vinacryl 4290 | 9 parts | none | 13 |
| | | Auxiliary Material | 1 part | | |
| | (ii) | " | | E | 26 |
| | (iii) | " | | D | 20 |
| | (iv) | " | | F | 30 |
| D. | (i) | Vinacryl 6815 | 9 parts | none | 2 |
| | | Auxiliary Material | 1 part | | |
| | (ii) | " | | B | 16 |
| | (iii) | " | | E | 16 |
| | (iv) | " | | G | 14 |
| | (v) | " | | H | 23 |

The improvement in gloss demonstrates the improved coating provided by the auxiliary material.

What we claim is:

1. A method of forming a varnish layer on a hydrophilic surface carrying at least one area of hydrophobic ink, comprising: applying to at least the inked portions of said surface a layer of an aqueous dispersion having a viscosity from about 25 to about 500 cps and containing from about 5% to about 60% by weight of a film forming copolymer or polymer, substantially insoluble in water at neutral pH, formed from a vinyl ester and/or acrylic ester, said dispersion further containing from about 0.5% to about 10% of an auxiliary film forming material capable of raising the critical surface tension of the hydrophobic ink area when coated thereon; and allowing said applied layer to dry.

2. A method according to claim 1 wherein the viscosity is from about 50 to about 300 cps.

3. A method according to claim 1 wherein the critical surface tension of the hydrophobic ink area is less than about 30 dynes $cm^{-1}$.

4. A method according to claim 3 wherein the critical surface tension of the hydrophobic ink area is less than about 25 dynes $cm^{-1}$.

5. A method according to claim 1 wherein the auxiliary material raises the critical surface tension by at least about 5 dynes $cm^{-1}$.

6. A method according to claim 5 wherein the critical surface tension is raised by at least about 10 dynes $cm^{-1}$.

7. A method according to claim 1 wherein the monomer moiety contains a carboxylic acid group.

8. A method according to claim 1 wherein the film forming copolymer or polymer is selected from the group consisting of (i) polymers of vinyl esters, (ii) polymers of acrylic esters, (iii) copolymers of vinyl and acrylic esters, (iv) copolymers of vinyl and/or acrylic esters with a monomer moiety selected from the group consisting of styrene, crotonic acid, itaconic acid, acrylic acid, 2-ethyl hexyl acrylate, and alkenes with 2 to 12 carbon atoms, and (v) polymers of alkyl methacrylic esters, wherein the alkyl group contains from 1 to 12 carbon atoms.

9. A method according to claim 1 wherein the auxiliary material is selected from the group of film forming materials consisting of (i) casein, (ii) poly vinyl pyrollidone and copolymers thereof with vinyl acetate, and (iii) alkali soluble copolymers of maleic anhydride with a moiety selected from the group consisting of styrene, alkenes having from 2 to 16 carbon atoms, vinyl alkyl ethers having from 1 to 4 carbon atoms in the alkyl group, and rosin acids with subsequent reaction with polyhydric alcohols containing 2 to 6 carbon atoms.

10. A method according to claim 9 wherein the alkene is ethylene, propylene or 1-hexene.

11. A method according to claim 1 wherein the hydrophilic surface is of paper.

12. A method according to claim 1 wherein the varnish layer has a weight of from about 1 to about 25 $g/m^2$.

13. A method according to claim 1 wherein said vinyl ester and/or acrylic ester is polymerized with a monomer moiety in the molar ratio of about 1:10 to about 10:1 to form said copolymer.

14. A hydrophilic surface carrying at least one area of hydrophobic ink and a varnish layer on the surface formed by the method of claim 1.

* * * * *